United States Patent
Büttner et al.

(10) Patent No.: US 12,042,089 B2
(45) Date of Patent: Jul. 23, 2024

(54) SYSTEM FOR PREPARATION OF FOOD AND METHOD FOR CONTROLLING A KITCHEN APPLIANCE

(71) Applicant: Vorwerk & Co. Interholding GmbH, Wuppertal (DE)

(72) Inventors: Christian Büttner, Stuttgart (DE); Hendrik Koetz, Wetter (DE); Marcelo Caballero, Wadenswil (CH); Stefan Rest, Wollerau (CH); Michael Sickert, Ennepetal (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 531 days.

(21) Appl. No.: 16/688,198

(22) Filed: Nov. 19, 2019

(65) Prior Publication Data

US 2020/0170447 A1    Jun. 4, 2020

(30) Foreign Application Priority Data

Dec. 3, 2018    (DE) .................... 10 2018 130 667.9

(51) Int. Cl.
*A47J 36/32*    (2006.01)
*A47J 27/00*    (2006.01)
(Continued)

(52) U.S. Cl.
CPC .......... *A47J 36/321* (2018.08); *A47J 27/004* (2013.01); *A47J 43/0722* (2013.01); *H04L 67/125* (2013.01)

(58) Field of Classification Search
CPC ...... A47J 36/321; A47J 27/004; A47J 43/046; A47J 43/0716; A47J 2043/0733;
(Continued)

(56) References Cited

U.S. PATENT DOCUMENTS

| | | | |
|---|---|---|---|
| 6,837,148 B1 * | 1/2005 | Deschenes | A47J 36/00 99/468 |
| 2003/0139843 A1 * | 7/2003 | Hu | H05B 6/688 700/211 |

(Continued)

FOREIGN PATENT DOCUMENTS

| | | |
|---|---|---|
| CH | 712659 A1 | 1/2018 |
| CN | 204931298 U | 1/2016 |

(Continued)

OTHER PUBLICATIONS

WO 2019068988 A1 (Year: 2019).*

*Primary Examiner* — Vy T Nguyen
(74) *Attorney, Agent, or Firm* — The Webb Law Firm

(57) ABSTRACT

In order to improve and make more reliable the preparation of food by several kitchen appliances, the present invention proposes a system and a method. The system for preparing foodstuffs comprises a first kitchen appliance, in particular a cook mixer, a second kitchen appliance and a control unit, the first kitchen appliance having at least one detection means for detecting at least one piece of information about the state of a foodstuff, wherein the first kitchen appliance is connected to the control unit via a first communication connection, and wherein the further kitchen appliance is connected to the control unit via a second communication connection, and is characterized in that the control unit is configured to compare the at least one piece of detected information about the state of the foodstuff with a preparation instruction and in that the control unit is configured to control the further kitchen appliance as a function of the result of the comparison.

7 Claims, 2 Drawing Sheets

(51) Int. Cl.
*A47J 43/07* (2006.01)
*H04L 67/125* (2022.01)

(58) Field of Classification Search
CPC .......... A47J 36/00; A47J 36/32; A47J 31/521;
A47J 43/0722; A47J 44/00; A47J 27/00;
A47J 27/002; A47J 27/10; A47J 31/4492;
A47J 31/52; A47J 31/5253; A47J 43/04;
A47J 43/042; A47J 43/07; A47J
2037/0617; A47J 2043/04454; A47J
2043/0738; A47J 2202/00; A47J 27/04;
A47J 27/05; A47J 27/12; A47J 27/14;
A47J 29/02; A47J 31/3623; A47J 31/401;
A47J 31/525; A47J 31/5251; A47J
31/5255; A47J 37/015; A47J 37/0611;
A47J 37/0623; A47J 37/0664; A47J
37/0786; A47J 37/08; A47J 37/0814;
A47J 37/0871; A47J 37/106; A47J
37/108; A47J 37/1219; A47J 37/1228;
A47J 39/00; A47J 43/00; A47J 43/0727;
A47J 43/087; A47J 44/02; A23L 5/10;
A23L 5/15; A23L 5/13; A23L 5/17; A23L
11/00; A23L 11/01; A23L 11/10; A23L
3/001; A23L 3/003; A23L 3/185; A23L
3/30; A23L 3/3418; A23L 3/358; A23L
3/3589; A23L 3/36; A23L 5/00; A23L
5/11; A23L 5/55; F24C 7/08; F24C
3/128; F24C 7/082; F24C 7/085; F24C
7/087; F24C 15/008; F24C 3/12; F24C
3/124; F24C 3/126; F24C 7/062; F24C
7/083; F24C 7/086; G01K 2207/06;
G01K 11/265; G01K 1/02; G01K 1/024;
G01K 1/14; G01K 7/42; H05B 6/6435;
H05B 6/688; H05B 6/6464; H05B
1/0261; H05B 6/6411; H05B 6/6438;
H05B 6/6441; H05B 1/0236; H05B
1/0263; H05B 1/0266; H05B 2213/05;
H05B 2213/07; H05B 6/02; H05B 6/062;
H05B 6/065; H05B 6/1209; H05B
6/6447; H05B 6/6455; H05B 6/6458;
H05B 6/6479; H05B 6/6482; H05B
6/668; H05B 6/687; H05B 6/705; H05B
6/72; H05B 6/725; A21B 1/52; A21B
7/005; A21C 11/006; A21C 1/00; A21C
1/02; A21C 1/1425; A21C 1/1435; A21C
1/1445; A21C 1/1455; A21C 1/146; A23C
9/1223; B01F 27/808; B01F 33/84; B01F
35/2206; B01F 35/2209; B01F
35/221422; B01F 35/22161; B01F
35/751; B01F 35/7548
USPC .......... 219/708, 518, 492, 702, 703; 99/285,
99/333, 334, 348, 349, 357, 421 TP, 468,
99/486; 426/233, 508; 126/19 R, 273 R;
434/127; 700/211
See application file for complete search history.

(56) References Cited

U.S. PATENT DOCUMENTS

| 2016/0238459 | A1* | 8/2016 | Koetz .................... G01K 1/024 |
| 2016/0270592 | A1 | 9/2016 | Sauerwald et al. |
| 2017/0224148 | A1* | 8/2017 | Koennings ............ A47J 27/002 |
| 2017/0245687 | A1 | 8/2017 | Stach et al. |
| 2018/0316519 | A1 | 11/2018 | Yan et al. |
| 2019/0053332 | A1* | 2/2019 | Cheng .................. H05B 3/0076 |
| 2019/0164116 | A1* | 5/2019 | Wallace ................. G06V 20/20 |
| 2019/0320844 | A1 | 10/2019 | Keller et al. |

FOREIGN PATENT DOCUMENTS

| CN | 107045301 A | 8/2017 |
| CN | 207164541 U | 3/2018 |
| DE | 102014112115 A1 | 2/2016 |
| DE | 102016111244 B3 | 10/2017 |
| EP | 3056882 A1 | 8/2016 |
| EP | 3069643 A1 | 9/2016 |
| EP | 3395216 A1 | 10/2018 |

* cited by examiner

SYSTEM FOR PREPARATION OF FOOD AND METHOD FOR CONTROLLING A KITCHEN APPLIANCE

CROSS-REFERENCE TO RELATED APPLICATION

This application claims priority to German Patent Application No. 10 2018 130 667.9 filed Dec. 3, 2018, the disclosure of which is hereby incorporated by reference in its entirety.

BACKGROUND OF THE INVENTION

Field of the Invention

The present invention relates to a system for preparation of food, with a first kitchen appliance, in particular a cooking mixer, with a further kitchen appliance and with a control unit, wherein the first kitchen appliance comprises at least one detection means for detecting at least one piece of information about the state of a foodstuff, wherein the first kitchen appliance is connected to the control unit via a first communication connection, and wherein the further kitchen appliance is connected to the control unit via a second communication. Furthermore, this relates to a method for controlling a kitchen appliance.

Description of Related Art

Networking and control systems are known in which a networked computer unit, for example a tablet or a smartphone, is used to control various devices. For example, it is known that a tablet is used to call up a cooking recipe from the Internet and to carry out preparation instructions, which can be derived from the recipe, using a kitchen appliance.

Kitchen appliances equipped with sensors to identify an object are also known. Such kitchen appliances should, for example, be able to suggest cooking recipes to a user according to the object recognized.

However, foodstuffs usually have different properties for natural reasons. As a concrete example, for two apples it cannot be assumed that the apples are exactly the same. This creates the difficulty of complying with a standardized preparation instruction, for example in the form of a recipe.

Typically, in a multi-step preparation process performed by different kitchen appliances, the individual kitchen appliances are controlled and coordinated by target values. Since the result of a preparation process depends on the actual properties of the food to be prepared, a successful result cannot always be achieved with the known solutions.

The problem addressed by the present invention is therefore to improve and to make more reliable the preparation of food by using several kitchen appliances.

SUMMARY OF THE INVENTION

According to a first teaching, this problem is solved by a system for preparation of food, with a first kitchen appliance, in particular a cooking mixer, with a further kitchen appliance and with a control unit, wherein the first kitchen appliance comprises at least one detection means for detecting at least one piece of information about the state of a foodstuff, wherein the first kitchen appliance is connected to the control unit via a first communication connection, and wherein the further kitchen appliance is connected to the control unit via a second communication connection, characterized in that the control unit is configured to compare the at least one piece of detected information about the state of the foodstuff with a preparation instruction and in that the control unit is configured to control the further kitchen appliance as a function of the result of the comparison.

This allows the further kitchen appliance to be controlled depending on the actual state of the food. Accordingly, the control of the further kitchen appliance can take into account both target values, which are specified by a preparation instruction, and actual values, which are detected. Consequently, a successful result can be achieved with increased reliability when carrying out a preparation step on the further kitchen appliance.

For example, the temperature and humidity of a bread dough have an influence on the yeast fungi that cause the bread dough to rise, and thus on the length of the time period it takes to bake the bread dough into a finished bread. The ingenious system allows the temperature and humidity of the bread dough to be measured and taken into account for baking.

Furthermore, several kitchen appliances can be networked in a higher-level coordination system, so that their interaction can be automated and optimized for the execution of a cooking recipe.

The term kitchen appliance refers to appliances which are configured to change the state of a foodstuff. This includes, for example, equipment that changes the state of a foodstuff from a raw state to a state ready for consumption, such as cooking or baking. Preferably, a baking oven or a microwave oven is used as a further kitchen appliance.

The first kitchen appliance and the second kitchen appliance may have other elements that directly or indirectly contribute to changing the state of a foodstuff, such as a moisture device for supplying water vapor. This can change the consistency of a foodstuff, such as when the foodstuff is bread dough.

In addition, the term kitchen appliance includes both appliances intended for private use in a household and appliances intended for use in an industrial environment and for preparing considerably larger quantities than, for example, for a private household.

The term "preparation of food" refers to an intended change in the state of a foodstuff and all actions necessary for this, such as cutting, crushing, stirring, heating, cooking, steam cooking, weighing, volume measurement and others.

In the following, the invention is described using a cook mixer as the first kitchen appliance, without the invention being limited to this. Also a scale, a mixer, a microwave oven, a baking oven or similar can be used as first kitchen appliance. A microwave oven, a baking oven, a steam cooker or another can be used as a further kitchen appliance.

All equipment that is equipped to mechanically comminute and/or mix food can be used as a cook mixer. The cook mixer preferably comprises a housing, a receiving volume, a comminuting device, a drive system and an energy supply system, wherein the receiving volume is provided for receiving a foodstuff, wherein the electric drive system is provided for driving the comminuting device, and wherein the comminuting device is configured to comminute and/or mix foodstuff received in the receiving volume.

The cook mixer shall have at least one means of detect at least one piece of information about the state of a food. Such a detecting mean can be configured in different ways, for example as a thermometer, as a balance, as a stopwatch or as a sensor for a torque. The cook mixer may have a single detecting mean or several simultaneous detection means.

Depending on the information to be detected, at least one detection mean may be located outside the cook mixer housing or inside the cook mixer housing. If, for example, the temperature of the foodstuff absorbed in the receiving volume is to be measured, then a thermometer is preferably arranged in the receiving volume. Furthermore, a humidity sensor can, for example, be arranged on an outer wall of the housing if a room-humidity is to be measured. This can be used, for example, to determine the moisture content of ingredients.

The at least one detection means of the cook mixer detects at least one piece of information about the state of a foodstuff. The state of a foodstuff may be defined by properties of different types which may be relevant depending on the intended preparation process. For example, a weight, a volume, a mixing ratio of different ingredients, a viscosity, a moisture content, a degree of browning, a color, an elapsed baking time, an elapsed resting time, an acid content or other can be detected.

The cook mixer can additionally or alternatively have at least one sensor for detecting a location. The term "location" refers to a spatial position defined by coordinates in three dimensions, including a height relative to sea level. By knowing the height position, an atmospheric pressure can be derived, and thus a temperature for a boiling point of the food.

The at least one piece of information detected shall preferably correspond to an actual value expressed in such a way that that the actual value is comparable to another piece of information of the same type. If, for example, information about a moisture content is detected, this corresponds to a relative value expressed as a percentage.

The system also has a control unit. The control unit preferably has a data memory, a microprocessor and a communication module, whereby computer algorithms stored in the data memory can be executed by the microprocessor. Executing the algorithm results in commands which can then be transmitted by the communication module to other devices, such as the cook mixer and/or the further kitchen appliance.

The cook mixer is connected to the control unit via a first communication connection and the further kitchen appliance is connected to the control unit via a second communication connection. The first communication connection and the second communication connection can be a cable connection or a wireless connection, respectively. Such a wireless connection can, for example, be based on a commonly used protocol such as Bluetooth, infrared or WLAN (wireless local area network). Any conversion of signals required for this can be carried out by the control unit.

Furthermore, information about the state of a foodstuff and commands to be carried out by the cook mixer or further kitchen appliance can preferably be transmitted via the first communication connection and via the second communication connection, respectively. Furthermore, both communication connections can be transmitted in the direction towards the control unit and from the control unit.

The control unit is configured to compare the at least one detected information on the state of the food with a preparation instruction and to control the further kitchen appliance as a function of the result of the comparison. Since the at least one piece of information corresponds to an actual value for a property of the food to be prepared, the effect of any previously performed preparation step on the food, or simply the actual state of a food, can be taken into account for the control of the further kitchen appliance.

For this purpose, preferably at least one preparation instruction is stored at least temporarily in the data memory, which is given for one function of the further kitchen appliance. The comparison between a piece of detected information and a preparation instruction may be achieved by executing an algorithm, preferably stored in the data memory of the control unit.

The preparation instruction is, in particular, at least one preparation parameter or target value relating to a preparation operation or to a state of the food to achieve. Such a preparation parameter can be given for one of the following variables: air temperature, baking time, resting time, information about a time at which a preparation process is to begin or end, distance to a heating element, height for a food carrier, humidity, internal food temperature, external food temperature, food shaping, food moisture, degree of browning, food weight, food volume, packing density of foodstuff units on a food carrier or other.

A preparation instruction preferably corresponds to at least one preparation direction of a recipe. A preparation direction can, for example, correspond to cooking temperatures that are to be observed for successive baking times, a rest period, a mixture of ingredients, a weight, a volume or something else.

Alternatively or additionally, the preparation instruction may contain at least one piece of information about a characteristic of the cook mixer or further kitchen appliance. Such a property may be, for example, a capacity of a receiving volume of the cook mixer, predictable wear on the drive system, a recommended maximum operating temperature for the further kitchen appliance, or a tare weight for comparison with a detected weight. Such a characteristic is preferably inherent to the appliance concerned and is preferably predetermined in advance by the designer of the cook mixer or, where appropriate, further kitchen appliance.

The first kitchen appliance and the further kitchen appliance each preferably have a preparation device for changing the state of a foodstuff. For this purpose, the preparation device can be set up for heating, cooling, comminuting, mixing or other purposes. Preferably the further kitchen appliance is configured as an oven or as a further cook mixer, so that the preparation device is preferably a heating element or a comminuting device.

The further kitchen appliance has a control unit which is preferably set up to control the functions or to control other components of the further kitchen appliance. If the further kitchen appliance is configured as an oven, then the control unit is preferably configured to switch the heating element on and off and to set the heating element at a set temperature for a determined time.

The control unit is located in the housing, i.e. integrated in the further kitchen appliance. This makes it easier to connect the control unit with other components of the further kitchen appliance to control them.

Furthermore, the control unit is configured to interact with a control unit in a system according to the first teaching. For this purpose, the control unit is preferably equipped with a communication module which is set up for connection to the control unit of the system via a communication connection. In this way, commands determined by the control unit can be transmitted to the control unit. In addition, the control unit is preferably configured to convert a command into a signal whose transmission and execution on further components of the further kitchen appliance causes a reaction of the component corresponding to the command.

If, for example, the further kitchen appliance is configured as an oven, the control unit can receive a target value temperature and convert this into a signal for the heating element, the execution of which on the heating element causes the heating element to be set at the target value temperature.

Furthermore, the further kitchen appliance may have detection means which are configured, for example, as optical detection means. The detection means may be located in the housing or on the outer surface of the housing of the further kitchen appliance. By interacting with a control unit, preferably an image detected by the optical means of the further kitchen appliance can be evaluated into information about a foodstuff. This makes it possible, for example, to detect a degree of browning, food shaping or packing density on a food carrier.

If, for example, the foodstuff to be prepared by the further kitchen appliance is bread dough in the form of dough pieces, then the packing density and the shape of the dough pieces have an influence on the baking process.

According to a second teaching, the above-mentioned task is solved by a method for controlling a kitchen appliance, in which at least one piece of information about the state of a foodstuff is detected by a first kitchen appliance, and in which the foodstuff is prepared by a further kitchen appliance, wherein the further kitchen appliance is controlled as a function of the at least one piece of detected information.

This allows a single kitchen appliance to be used for the detecting and several further kitchen appliances which may not have a suitable detection means to be controlled according to the detecting. For example, if the first kitchen appliance is a scale and the second kitchen appliance is an oven, the weight of a loaf of bread dough can be measured by the scale before a preparation step and the oven can then be set to a baking temperature suitable for that weight.

Overall, a method according to the second teaching enables the coordination of several kitchen appliances that can be configured to the actual state of a food to be prepared.

If, for example, the first kitchen appliance is configured as a cook mixer and the further kitchen appliance is configured as an oven, then on the one hand the further kitchen appliance can be controlled depending on information detected by the cook mixer. On the other hand, the cook mixer can be controlled depending on information detected by the further kitchen appliance.

The process can also create a control chain for several kitchen appliances, which can be used one after the other for an entire preparation process.

In the following, different forms of implementation of the system and the method are described, whereby the individual embodiments apply both to the system and to the method. In addition, the individual embodiments can be combined with each other.

In a first embodiment of the system, the further kitchen appliance is configured to heat the food according to a heating profile and the control unit is configured to adapt the heating profile as a function of the result of the comparison between the at least one detected information about the state of the foodstuff and a preparation instruction.

In a corresponding embodiment of the method, the foodstuff is heated as a function of a heating profile, the at least one detected information about the state of the foodstuff is compared with a preparation instruction, and the heating profile is adapted as a function of the at least one information detected about the state of the foodstuff.

This allows a recommended sequence of a preparation step in the form of a heating profile to be adapted to the actual state of the food to be prepared. Consequently, if a foodstuff does not correspond exactly to a theoretical initial state recommended by a recipe, for example, the preparation process can be adapted accordingly.

This also allows a control loop to be created for the entire system on the basis of target values specified by a recommended heating profile and detected actual values. In industrial environments, for example, such control loops play an important role in compliance with quality regulations.

The further kitchen appliance is equipped to heat the foodstuff as a function of a heating profile. For this purpose, the further kitchen appliance preferably has a preparation device in the form of a heating element, which can be adjusted by a control unit. Preferably, by interaction of the control unit with the heating element, temperature values can be maintained which are specified by the heating profile and for a given time.

The heating profile preferably contains at least one piece of information about a temperature curve, i.e. a relationship between time and temperature values. The heating profile is preferably specified before the preparation step to be carried out by the further kitchen appliance has started. If, for example, a temperature for a given duration is recommended for a recipe, then the heating profile can be a constant function of the temperature for this duration.

The heating profile can also be linked to other information about a preparation step, where such information can relate to a specific function of the further kitchen appliance. The heating profile can, for example, be linked to information on air humidity, a preheating time, a type of heating, such as steam cooking, top heat, bottom heat or circulating air, or other information.

According to the first teaching, the control unit is set up to compare a piece of detected information about the state of the foodstuff with a preparation instruction, and according to the present embodiment of the system, the control unit is set up to adapt the heating profile according to the result of the comparison.

Accordingly, changing the heating profile can be determined by the control unit as follows. In a first step, the control unit compares the piece of detected information with the preparation instruction. In a further step, the control unit assigns the result of the comparison to a value range to which a change to be carried out for the heating profile is linked. Preferably at least two such value ranges are stored in the data memory of the control unit. In a further step, the control unit produces a corresponding command, the execution of which causes the heating profile to be changed according to the particular change measure to be carried out.

For example, if information on dough strength is detected and a preparation instruction for dough strength is given, the control unit can determine whether the detected dough strength is higher, equal or lower than the preparation instruction. Based on the result and on stored value ranges, the control unit can then determine whether the heating profile is to be retained or changed as originally intended, for example, to extend a baking time or increase a baking temperature.

Preferably, the control device is also set up to determine a new heating profile for value ranges for which no link has yet been stored. If, for example, the comparison results in a constellation of best-fitting value ranges for which the preparation instructions do not specify a heating profile, the control unit determines a new heating profile from the heating profiles that are linked to the value ranges adjacent to the best-fitting value ranges. This results in a heating profile adapted to the information detected for controlling the further kitchen appliance.

In another embodiment of the system, the first kitchen appliance's detection means are configured to detect information about the current state of the foodstuff at regular intervals, the control unit is configured to store the detected information in a preparation history, and the control unit is configured to control the further kitchen appliance according to the preparation history.

This enables information about the state of the foodstuff to be prepared to be assigned to a detecting point in time and the actual, current state of the food to be taken into account when controlling the further kitchen appliance.

This can be quite relevant if, for example, the detecting and preparation by the further kitchen appliance are significantly apart in time. For example, it is possible to initially detect when the food is in a frozen state, whereby a preparation step is not to be carried out until later, i.e. when the food has probably been defrosted, by the further kitchen appliance.

The term "detecting at regular intervals" refers to repeated detecting at successive points in time. Preferably, at least one significant time interval, i.e. a duration between two successive points in time, is stored in the data memory of the control unit and is used when executing an algorithm, the execution of which causes a detection by the detection means of the cook mixer.

A preparation history is defined as a set of successively detected and stored information, whereby this information relates to the state of the same foodstuff. The foodstuff concerned may be a mixture of several ingredients. This information is preferably stored in the data memory of the control unit. The information can be transmitted to the control unit immediately after each detecting and stored there or first detected by the cook mixer and then transmitted together to the control unit and stored there.

In a corresponding embodiment of the method, the food is prepared by the first kitchen appliance in a first preparation operation and the food is further prepared by the further kitchen appliance in a further preparation operation, a preparation history of the first preparation operation being taken into account for controlling the further kitchen appliance in the further preparation operation.

This means that the actual process of the preparation previously carried out by the cook mixer can be taken into account when controlling the further kitchen appliance.

In another embodiment of the system, the control unit is connected to an external database of preparation instructions. This will allow access to a greater variety of preparation instructions, where appropriate, thus increasing the number of possibilities to prepare food through the system.

The term database refers to all media on which at least one preparation instruction can be stored digitally, such as a hard disk, a cloud, a server or similar. Furthermore, an external database is preferably understood to be media which are not part of the originally intended data memory of the control unit and which can be connected to the control unit via a communication connection. For example, the following media can be considered: USB sticks, external hard disks, tablets, computers, wearables and computer units in general, Internet, cloud, storage medium of a private network and others.

In another embodiment of the system, the control unit is integrated in the first kitchen appliance or in the further kitchen appliance.

This makes it easier to design the system. This can further increase customer loyalty by making the presence of the cook mixer necessary for optimum control of the further kitchen appliance.

The term integration refers to the arrangement of the control unit at or in the housing of the cook mixer or further kitchen appliance.

In a further embodiment of the method, at least one piece of information about a preparation parameter is detected during the further preparation process and the further kitchen appliance is controlled depending on the at least one information about a preparation parameter.

This allows the further kitchen appliance to be controlled depending not only on information detected by the first kitchen appliance, i.e. information on an earlier state of the food, but also on a current state of the food during the further preparation process. This allows the further kitchen appliance to be controlled in relation to any change in the state of the food or the further kitchen appliance itself.

The terms "information about a preparation parameter" means information on the state of a foodstuff, information on the properties of the further kitchen appliance and/or information on the environment of the further kitchen appliance. For example, a temperature, a degree of humidity, a viscosity, a volume or other data can be detected by the further kitchen appliance.

The further kitchen appliance shall preferably have at least one detection means which is configured, for example, to detect the following information: composition of ingredients, weight, temperature, viscosity or shape of the food, degree of humidity or temperature in the further kitchen appliance. The composition of the foodstuff is defined as the ratio of ingredients originally used to make the food to be prepared to the type of food, such as meat, vegetables, bread or other.

BRIEF DESCRIPTION OF THE DRAWINGS

In the following, preferred embodiments of the invention are explained in more detail using the attached drawing. The drawing shows in FIG. 1 a first example of a system for the preparation of food in a schematic representation, and FIG. 2 a further example of a system for preparing food in a schematic representation.

DESCRIPTION OF THE INVENTION

Figure 1:
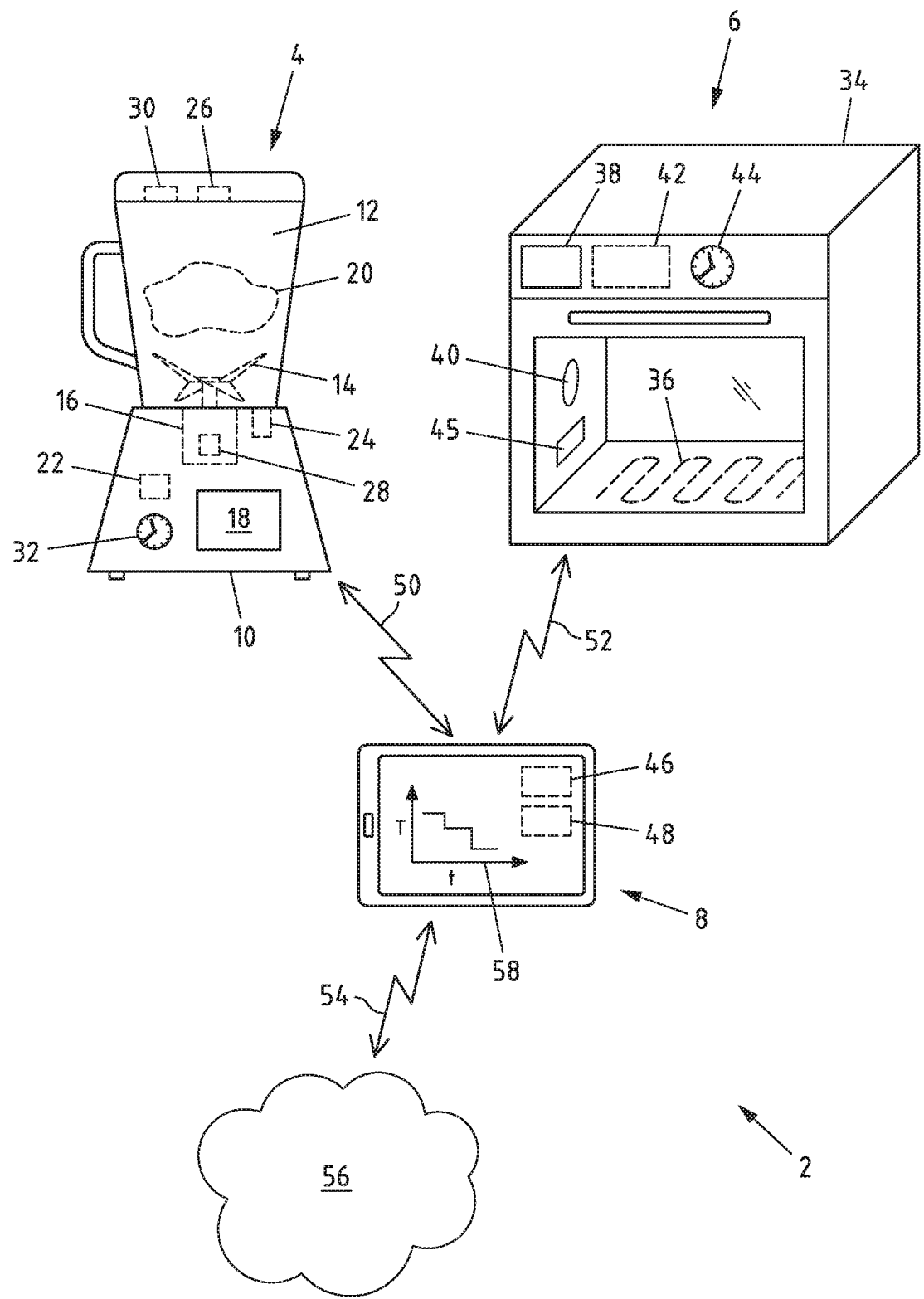

FIG. 1 shows a first example of a system 2 for the preparation of food in a schematic representation. The system has a cook mixer 4, a kitchen appliance 6 and a control unit 8.

The cook mixer 4 has a housing 10, a receiving volume 12, a comminuting and mixing device 14, a drive system 16 and a control unit 18. A foodstuff 20 in the form of bread dough to be prepared is arranged in the receiving volume 12. Mixing device 14 is configured to mix ingredients of food 20 together, and control unit 18 is configured to control mixing device 14.

Furthermore, the cook mixer 4 has several detection means 22, 24, 26, 28, 30, 32, which are each designed as GPS sensor 22, weighing module 24, thermometer 26, viscosity sensor 28, humidity sensor 30 and stopwatch 32, respectively. The GPS sensor 22 and the stopwatch 32 are arranged in the housing 10 of the cook mixer 4. The thermometer 26 and the humidity sensor 30 are partially arranged in the receiving volume 12 to measure the temperature and the humidity level within the receiving volume 12. The scale module 24 is arranged at the receiving volume 12 in such a way that a food weight can be determined by the scale module 24. The viscosity sensor 28 is arranged in the drive system 16 of the mixing device 14 and is configured to detect a mechanical resistance and a number of revolutions per time unit and to derive from this a food viscosity or dough strength.

The detection means 22, 24, 26, 28, 30, 32 are connected to the control unit 18 and the detected information is transmitted to the control unit 18 after detection.

The kitchen appliance 6 is configured as an oven with a housing 34, with a preparation device for changing the state of a foodstuff in the form of a heating element 36, with a display device 38, with a humidity device 40 for supplying water vapor and with a control unit 42, wherein the control unit 42 is arranged in the housing 34. In addition, the kitchen appliance 6 has a clock 44 and a thermometer 45, which is set up to detect the actual temperature in the kitchen appliance 6. The control unit 42 of the kitchen appliance 6 is connected to the clock 44 and is configured to control the heating element 36 depending on a heating profile.

The control unit 8 is designed as a tablet with a data memory 46 and with a microprocessor 48 which is connected via a first communication connection 50 to the control unit 18 of the cook mixer 4 and which is connected via a second communication connection 52 to the control unit 42 of the kitchen appliance 6. The first communication connection 50 and the second communication connection 52 are wireless and are made via WLAN.

The control unit 8 is connected via an Internet connection 54 to an external database 56 of preparation instructions. Furthermore, an algorithm is stored in the data memory 46 of the control unit 8, by which algorithm a preparation instruction can be called up from the external database 56 and by which algorithm a called up preparation instruction is stored in the data memory 46 of the control unit 8.

The preparation instruction called up has several heating profiles, each of which is linked to at least one of the following information: value ranges for an atmospheric pressure, value ranges for a food weight, value ranges for a food temperature, value ranges for a food viscosity or dough strength, and value ranges for a degree of humidity.

Such a heating profile 58 is shown schematically on control unit 8.

The control unit 8 is also set up to compare the detected information with the corresponding value ranges of the preparation instructions. The comparison results in heating profile 58, which is linked to the most suitable value ranges. In addition, control unit 8 is configured to determine commands for the kitchen appliance 6 according to the specific heating profile 58.

A method for the preparation of food by the system 2 of FIG. 1 is described in the following as an example.

First, a preparation instruction in the form of a recipe for bread is called up via Internet connection 54 from the external database 56 and via control unit 8. This preparation instruction is then stored in data memory 46 of control unit 8.

In accordance with the preparation instructions, the ingredients for a bread dough are poured into the receiving volume 12 of the blender 4. Furthermore, the kitchen appliance 6 is set to a temperature for a preheating time, whereby the temperature and the preheating time are specified by the preparation instructions.

The ingredients are then mixed together by the mixing device 14 in a first preparation process. The GPS sensor 22, the weighing module 24, the thermometer 26, the viscosity sensor 28 and the humidity sensor 30 then detect the position of the blender 4, the weight and viscosity of the bread dough 20 and the temperature and degree of humidity prevailing in the receiving volume 12. Then a predetermined rest period is waited for, during which the bread dough 20 is to rise. This rest time is detected by the stopwatch 32.

The acquired information is then transmitted to the control unite 8 via the first communication connection 50 and stored in the data memory 46 of the control unit 8. This information is then compared with a preparation instruction for making bread, which is also stored in data memory 46 of control unit 8. The properties of the ingredients used to prepare the bread dough 20 are taken into account.

For example, such a preparation label may contain the following information and links:

| Ingredient or type of bread | Value ranges for a dough weight in kg | Temperature in C. ° | Baking time in minutes |
|---|---|---|---|
| wheat bread | 0.5 | [220-240] | [30-35] |
| rye bread | 0.5 | [210-260] | [35-40] |
| rye bread | 1.0 | [220-270] | [60-65] |
| rye bread | 1.5 | [220-270] | [65-75] |
| rye bread scrap | 1.0 | [220-270] | [60-65] |
| country bread | 1.2 | [190-220] | [50-55] |

The first column of the above table contains different bread types and the second column different value ranges for a dough weight. Furthermore, adjacent horizontal cells of the last two columns specify a temperature for a baking time and thus form a heating profile that is linked to the information of the cells arranged in the same row.

The values of the second, third and fourth columns are entered as guide values and can vary within the tolerance of a measuring system used. For example, a dough weight can be determined with an accuracy of 10%. The measured temperature and baking time also typically depend on the accuracy of the measuring equipment used.

Depending on the result of the comparison, the control unit 8 determines a heating profile 58 for the kitchen appliance 6 and corresponding commands, the execution of which on the control unit 42 of the kitchen appliance 6 is intended to cause heating according to the determined heating profile 58 and, if necessary, a supply of water vapor in the kitchen appliance 6.

These commands are then transmitted via the second communication connection 52 to the control unit 42 of the kitchen appliance 6, which then adjusts the heating element 36 and the humidity device 40 of the kitchen appliance 6 according to the heating profile 58.

In a second preparation process, the bread dough 20 prepared by the cook mixer 4 is picked up by the kitchen appliance 6 and then heated according to the specified heating profile 58. The heating element 36 is controlled by the clock 44 and the thermometer 45 of the kitchen appliance 6. At the end of the second preparation process, i.e. after the duration specified by the heating profile 58 has elapsed, the display 38 of the kitchen appliance 6 displays a message and the heating element 36 is switched off.

A further method for the preparation of food by System 2 of FIG. 1 is described in the following as an example.

Here only information about the foodstuff 20 is detected by the cook mixer 4, without the food 20 being prepared by the cook mixer 4. In addition, a preparation instruction corresponding to the type of food 20, i.e. bread dough, is called up and stored via control unit 8.

Similar to the previous procedure, the information detected is compared by control unit 8 with a previously stored preparation instruction and a heating profile 58 or corresponding commands is determined for kitchen appliance 6.

Then the foodstuff is prepared by the kitchen appliance 6 according to the heating profile 58, so that as a result the bread dough 20 is baked to a finished bread with a crust.

Figure 2:
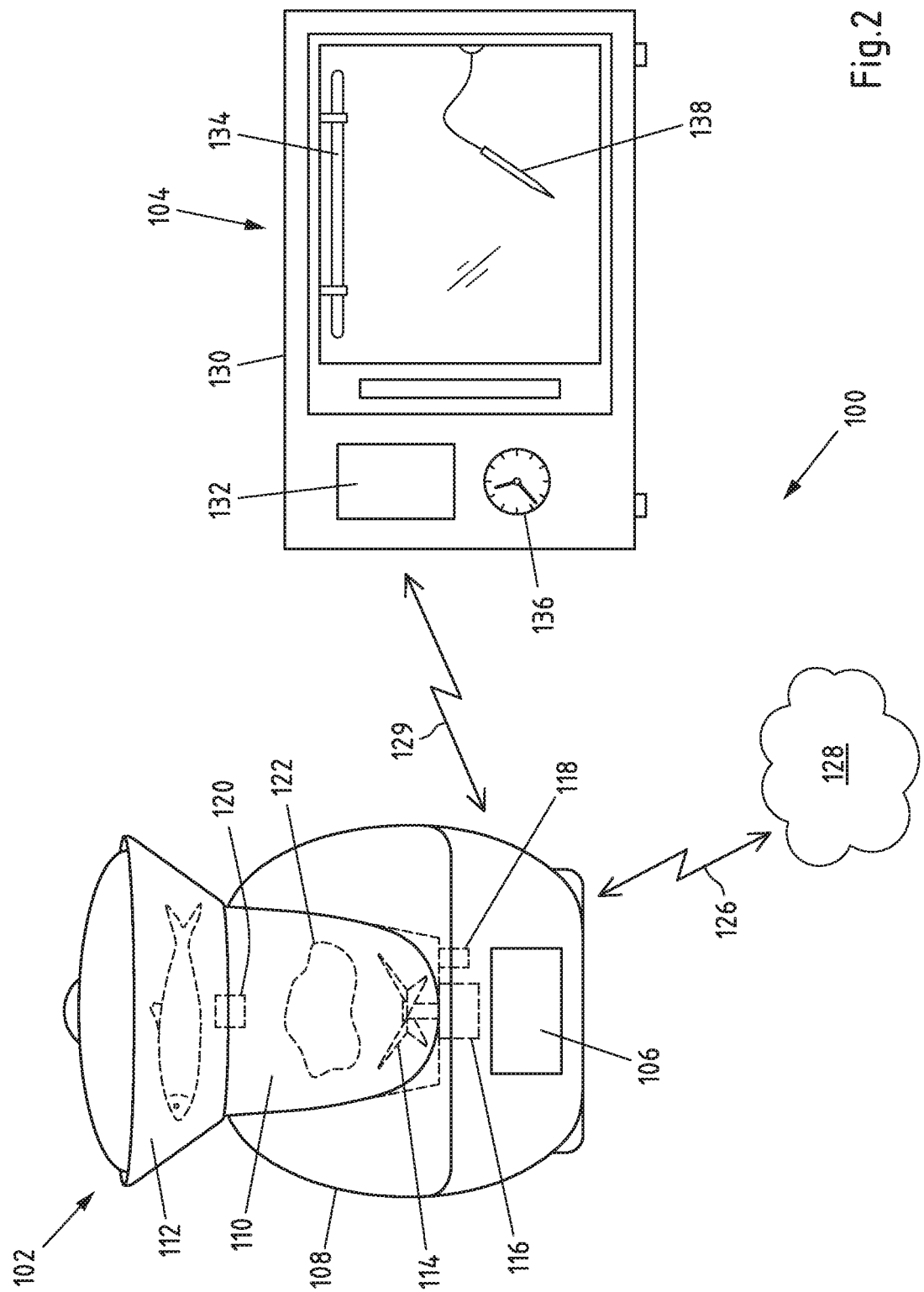

FIG. 2 shows another example of a system 100 for the preparation of food in a schematic representation. The System 100 has a cook mixer 102, a kitchen appliance 104 and a control unit 106.

The cook mixer 102 has a housing 108, a first receiving volume 110, a second receiving volume 112, a mixing device 114 and a drive system 116. The cook mixer 102 further comprises a weighing module 118 and a thermometer 120 configured to detect the weight and temperature of a first foodstuff 122 contained in the first receiving volume 110 and a second foodstuff 124 contained in the second receiving volume 112.

The control unit 106 is integrated in the cook mixer 102, i.e. it is located in the housing 108 of the cook mixer 102 and is set up to control the components of the cook mixer 102 and their functions. This provides a direct connection between the control unit 106 and the blender 102. Furthermore, the control unit 106 is connected via an Internet connection 126 to an external database 128 of preparation instructions and via a communication connection 129 to the kitchen appliance 104.

The kitchen appliance 104 is configured as a microwave oven with a housing 130, with a control unit 132 and with a heating element 134. The control unit 132 is configured to control the heating element 134 depending on a heating profile. In addition, the kitchen appliance 104 has a clock 136 and a thermometer 138 to measure the temperature of a foodstuff.

A method for preparing food using the system 100 of FIG. 2 is described below as an example.

First, in a first preparation process, the first foodstuff 122 is prepared in the form of a sauce and the second foodstuff 124 in the form of a fish is prepared by the cook-mixer 102 in accordance with a preparation instruction. As long as the foodstuffs 122, 124 are arranged in the respective receiving volumes 110, 112, the weighing module 118 and the thermometer 120 detect the common weight and temperature of the two foodstuffs 122, 124 at regular intervals. This can be done before, during and/or after the first preparation process. Based on this information, the control unit 106 creates a preparation history.

Here the food 122, 124 remain arranged in the cook mixer 102 after the first preparation process. The preparation history reveals that foodstuffs 122, 124 cool down and reach a temperature lower than a recommended initial temperature by the preparation instruction for a second preparation operation to be performed by the kitchen appliance 104. According to the detected temperature difference, the control unit 106 determines a new, adapted heating profile and corresponding commands for the control unit 132 of the kitchen appliance 104.

These commands are transmitted via communication connection 129 to control unit 132 of kitchen appliance 104. In a second preparation process, the control unit 132 adjusts the heating element 134 according to the commands transmitted so that the foodstuffs 122, 124 are heated according to the adapted heating profile.

A further method for the preparation of food by the system 100 of FIG. 2 is described in the following as an example.

Similar to the procedure described above, a preparation instruction is called up and stored. The first foodstuff 122 and the second foodstuff 124 are prepared in a first preparation process by the cook mixer 102. The weighing module 118 and the thermometer 120 of the blender 102 detect the weight and the temperature of the foodstuffs 122, 124 at the end of the first preparation and the control unit 106 determines a heating profile for the kitchen appliance 104 depending on a comparison of the detected information with the preparation instructions.

During a second preparation process, the control unit 132 controls the heating element 134 of the kitchen appliance. Meanwhile, the thermometer 138 measures the temperature of the foodstuffs 122, 124. The control unit 106 compares this temperature with a temperature given by the preparation instruction, which must not be exceeded during the second preparation process. The comparison shows that the recommended temperature has been exceeded. The control unit 106 changes the heating profile for the kitchen appliance 104 accordingly so that the temperature of the preparation instructions is maintained.

The invention claimed is:

1. A system for preparation of food, comprising:
a processor;
a first kitchen appliance connected to the processor via a first communication connection, wherein the first kitchen appliance comprises at least one detector for detecting at least one piece of information about a state of a foodstuff,
wherein the detected at least one piece of information about the state of the foodstuff comprises a current state of the foodstuff,
wherein the at least one detector is configured to detect a plurality of the current state of the foodstuff, and wherein each of the plurality of the current state of the foodstuff is detected at one of regular time intervals; and
a further kitchen appliance connected to the processor via a second communication connection,
wherein the processor is configured to compare the detected at least one piece of information about the state of the foodstuff with a preparation instruction,
wherein the processor is configured to control the further kitchen appliance as a function of a result of the comparison,
wherein the processor is configured to store the detected at least one piece of information about the state of the foodstuff in a preparation history,
wherein the preparation history is an information set comprising a plurality of the detected at least one piece of information about the state of the foodstuff, wherein the information set is successively detected and stored,
wherein all of plurality of the detected at least one piece of information about the state of the foodstuff are first detected by the first kitchen appliance and all of the plurality of the detected at least one piece of information about the state of the foodstuff are then transmitted together to the processor and stored in a data memory of the processor, and
wherein the processor is configured to control the further kitchen appliance as a function of the preparation history.

2. The system according to claim 1,
wherein the further kitchen appliance is configured to heat the foodstuff as a function of a heating profile, and
wherein the processor is configured to adjust the heating profile as a function of the result of the comparison.

3. The system according to claim 1,
wherein the processor is connected to an external database for preparation instructions.

4. The system according to claim 1,
wherein the processor is integrated in the first kitchen appliance or in the further kitchen appliance.

5. A method for controlling kitchen appliances, comprising:
detecting at least one piece of information about a state of a foodstuff by a first kitchen appliance,
preparing the foodstuff by a further kitchen appliance,
controlling by a processor the further kitchen appliance as a function of the detected at least one piece of information about the state of the foodstuff,
preparing the foodstuff in a first preparation operation by the first kitchen appliance,
preparing the foodstuff in a further preparation operation by the further kitchen appliance, and
taking into account by the processor a preparation history of the first preparation operation in the further preparation operation for controlling the further kitchen appliance,
wherein the preparation history is an information set comprising a plurality of the detected at least one piece of information about the state of the foodstuff, wherein the information set is successively detected and stored and
wherein all of the plurality of the detected at least one piece of information about the state of the foodstuff are first detected by the first kitchen appliance and all of the plurality of the detected at least one piece of information about the state of the foodstuff are then transmitted together to the processor and stored in a data memory of the processor.

6. The method according to claim 5, further comprising:
heating the foodstuff as a function of a heating profile,
comparing the detected at least one piece of information about the state of the foodstuff with a preparation instruction, and
adapting the heating profile as a function of the detected at least one piece of information about the state of the foodstuff.

7. The method according to claim 5, further comprising:
detecting at least one piece of information about a preparation parameter during the further preparation operation, and
controlling the further kitchen appliance as a function of the detected at least one piece of information about the preparation parameter.

\* \* \* \* \*